(12) United States Patent
Sakamoto

(10) Patent No.: US 11,120,207 B2
(45) Date of Patent: Sep. 14, 2021

(54) INFORMATION PROCESSING APPARATUS, INFORMATION PROCESSING METHOD, AND STORAGE MEDIUM

(71) Applicant: SHARP KABUSHIKI KAISHA, Sakai (JP)

(72) Inventor: Kiho Sakamoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/986,185

(22) Filed: Aug. 5, 2020

(65) Prior Publication Data

US 2021/0042465 A1 Feb. 11, 2021

(30) Foreign Application Priority Data

Aug. 6, 2019 (JP) .............................. JP2019-144782

(51) Int. Cl.
| | | |
|---|---|---|
| G06F 17/00 | (2019.01) | |
| G06F 40/169 | (2020.01) | |
| G06F 40/106 | (2020.01) | |
| G06F 16/9035 | (2019.01) | |
| G06F 16/93 | (2019.01) | |

(52) U.S. Cl.
CPC ........ *G06F 40/169* (2020.01); *G06F 16/9035* (2019.01); *G06F 16/93* (2019.01); *G06F 40/106* (2020.01)

(58) Field of Classification Search
CPC ...... G06F 40/169; G06F 40/106; G06F 16/93; G06F 16/9035
See application file for complete search history.

(56) References Cited

U.S. PATENT DOCUMENTS

| 8,635,166 | B1 * | 1/2014 | Agrawal | ................. | G06F 21/30 |
| | | | | | 705/75 |
| 9,552,396 | B2 * | 1/2017 | Hall | ........................ | G06F 16/48 |
| 2005/0091027 | A1 * | 4/2005 | Zaher | .................... | G06F 40/169 |
| | | | | | 703/22 |
| 2005/0223315 | A1 * | 10/2005 | Shimizu | ................ | G06F 40/169 |
| | | | | | 715/230 |
| 2006/0239248 | A1 * | 10/2006 | Hawk | .................... | G06F 3/0483 |
| | | | | | 370/352 |

(Continued)

FOREIGN PATENT DOCUMENTS

JP 2007-334503 A 12/2007

*Primary Examiner* — Laurie A Ries
(74) *Attorney, Agent, or Firm* — ScienBiziP, P.C.

(57) ABSTRACT

An information processing apparatus according to the present disclosure includes an acquisition processor that acquires position information on a designated position designated by each of a plurality of users, in a sheet displayed in a display, identification information of the each of the plurality of users, and input information input by each of the plurality of users, a first display processor that displays an identification image corresponding to the acquired identification information at a position corresponding to the designated position in the sheet, an importance determiner that determines an importance for every designated position in the sheet, based on the acquired identification information and input information, and a second display processor that displays, based on the determined importance, an object image indicating an important part in the sheet in association with the designated position.

10 Claims, 9 Drawing Sheets

(56) References Cited

U.S. PATENT DOCUMENTS

| | | |
|---|---|---|
| 2007/0288839 A1 | 12/2007 | Kurosawa |
| 2009/0276719 A1* | 11/2009 | Pardehpoosh ......... G06Q 30/02 |
| | | 715/762 |
| 2010/0100904 A1* | 4/2010 | Kawakami ......... H04N 21/8133 |
| | | 725/37 |
| 2010/0313114 A1* | 12/2010 | Colbran ................ G06F 40/169 |
| | | 715/230 |
| 2015/0127382 A1* | 5/2015 | Al-Shaykh ............. G06Q 50/20 |
| | | 705/3 |
| 2017/0286415 A1* | 10/2017 | Kumar .................... G06F 16/93 |
| 2017/0329750 A1* | 11/2017 | Kazama ................ G06F 40/169 |
| 2018/0132011 A1* | 5/2018 | Shichman ........ H04N 21/23418 |
| 2018/0336459 A1* | 11/2018 | Baughman ............ G06F 40/151 |
| 2019/0012303 A1* | 1/2019 | Okamoto ............ G06F 16/2322 |

* cited by examiner

FIG. 2

USER INFORMATION (D1)

| USER ID | USER ICON ID |
|---|---|
| U001 | I001 |
| U002 | I002 |
| U003 | I003 |
| U004 | I004 |

FIG. 3

COMMENT INFORMATION (D2)

| SHEET ID | COMMENT ID | USER ID | INPUT DATE AND TIME | DESIGNATED POSITION | COMMENT CONTENT | CATEGORY |
|---|---|---|---|---|---|---|
| S001 | C001 | U001 | t1 | P1 | "aaaaa" | SOLVED |
| S001 | C002 | U002 | t2 | P1 | "bbbbb" | SOLVED |
| S001 | C003 | U003 | t3 | P1 | "ccccc" | SOLVED |
| S001 | C004 | U004 | t4 | P1 | "ddddd" | SOLVED |
| S001 | C001 | U001 | t5 | P2 | "xxxxx" | SOLVED |
| ... | ... | ... | ... | ... | ... | ... |
| S002 | C002 | U002 | t11 | P3 | "bbbbb" | QUESTION |
| ... | ... | ... | ... | ... | ... | ... |

INFORMATION PROCESSING APPARATUS, INFORMATION PROCESSING METHOD, AND STORAGE MEDIUM

INCORPORATION BY REFERENCE

This application is based upon and claims the benefit of priority from the corresponding Japanese Patent Application No. 2019-144782 filed on Aug. 6, 2019, the entire contents of which are incorporated herein by reference.

BACKGROUND OF THE INVENTION

The present disclosure relates to an information processing apparatus, an information processing method, and a storage medium by which it is possible to allow a plurality of users to share a sheet displayed in a display.

Conventionally, a system is known in which a sheet (page) displayed in a display is shared by a plurality of users, and each of the users adds a comment to the sheet or further adds a reply comment to the comment.

For example, a system is proposed in which a message obtained by collectively editing: for information on an annotation added to a shared document, attribute information including an annotation ID, an electronic document ID, a user ID of a user who added the annotation, a date and time when the annotation is added, position information of an additional position on an electronic document, a type of the annotation, and a priority of the annotation; and a comment content described as an annotation, is transmitted to a user reviewing the electronic document.

The conventional technology has a problem in that if a comment count given to one sheet increases, it is difficult to grasp an important part such as a part where a discussion is actively debated and a part where discussions are concentrated on the sheet.

SUMMARY OF THE INVENTION

An object of the present disclosure is to provide an information processing apparatus, an information processing method, and a storage medium by which it is possible to easily grasp an important part in a sheet shared by a plurality of users.

An information processing apparatus according to an aspect of the present disclosure includes an acquisition processor that acquires position information on a designated position designated by each of a plurality of users, in a sheet displayed in a display, identification information of each of the plurality of users, and input information input by each of the plurality of users, a first display processor that displays an identification image corresponding to the identification information acquired by the acquisition processor at a position corresponding to the designated position in the sheet, an importance determiner that determines a first importance indicating an importance for every designated position in the sheet, based on the identification information and the input information acquired by the acquisition processor, and a second display processor that displays an object image indicating an important part in the sheet, in association with the designated position, based on the first importance determined by the importance determiner.

An information processing method according to another aspect of the present disclosure executed by one or more processors includes acquiring position information on a designated position designated by each of a plurality of users, in a sheet displayed in a display, identification information of each of the plurality of users, and input information input by each of the plurality of users; displaying an identification image corresponding to the identification information acquired at a position corresponding to the designated position in the sheet; determining a first importance indicating an importance for every designated position in the sheet, based on the identification information and the input information acquired; and displaying an object image indicating an important part in the sheet, in association with the designated position, based on the first importance determined.

In a non-transitory storage medium for storing an information processing program according to another aspect of the present disclosure, the information processing program causes one or more processors to execute acquiring position information on a designated position designated by each of a plurality of users, in a sheet displayed in a display, identification information of each of the plurality of users, and input information input by each of the plurality of users; displaying an identification image corresponding to the identification information acquired at a position corresponding to the designated position in the sheet; determining a first importance indicating an importance for every designated position in the sheet, based on the identification information and the input information acquired; and displaying an object image indicating an important part in the sheet, in association with the designated position, based on the first importance determined.

According to the present disclosure, it is possible to provide an information processing apparatus, an information processing method, and a storage medium by which it is possible to easily grasp an important part in a sheet shared by a plurality of users.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a table showing an example of user information utilized in a management server according to the embodiment of the present disclosure;

FIG. 3 is a table showing an example of comment information utilized in the management server according to the embodiment of the present disclosure;

DESCRIPTION OF THE PREFERRED EMBODIMENTS

An embodiment of the present disclosure will be described below with reference to the attached drawings. The following embodiment is an example in which the present disclosure is embodied, and does not intend to limit the technical scope of the present disclosure.

Figure 1:
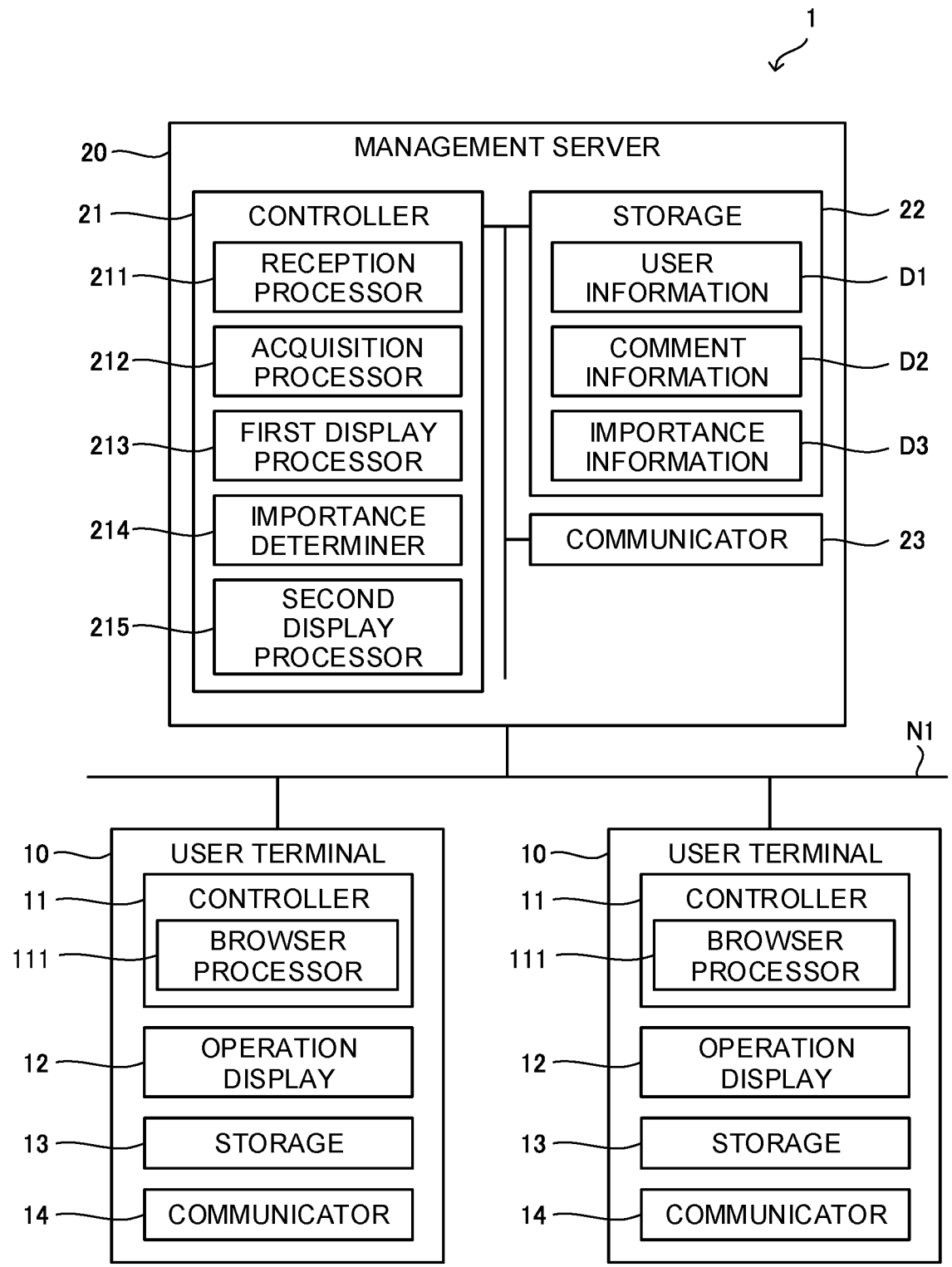
FIG. 1 is a block diagram illustrating a configuration of a file management system according to an embodiment of the present disclosure.

As illustrated in FIG. 1, a file management system 1 according to the embodiment of the present disclosure includes a plurality of user terminals 10 and a management server 20. The plurality of user terminals 10 and the management server 20 communicate with one another via a communication network N1 such as the Internet, LAN, WAN, or a public telephone line. Although in FIG. 1, the two user terminals 10 are illustrated, the number of user terminals 10 is not limited. The management server 20 is an example of an information processing apparatus according to the present disclosure.

User Terminal 10

Such a user terminal 10 includes a controller 11, an operation display 12, a storage 13, and a communicator 14. The user terminal 10 is a terminal device owned by a user, and is an information processing apparatus such as a personal computer, a tablet terminal, a smartphone, or a mobile phone.

The communicator 14 is a communication interface for connecting the user terminal 10 to the communication network N1 in a wired or wireless manner to execute data communication according to a predetermined communication protocol between the user terminal 10 and an external device such as the management server 20 via the communication network N1.

The operation display 12 is a user interface including a display such as a liquid crystal display or an organic EL display that displays various types of information, and an operation processor such as a mouse, a keyboard, or a touch panel that receives an operation. The operation display 12 is an example of a display according to the present disclosure.

The storage 13 is a non-volatile storage including a hard disk drive (HDD), a solid state drive (SSD), or a flash memory that stores various types of information. For example, the storage 13 stores a control program such as a browser program. Specifically, the browser program is a control program for causing the controller 11 to execute a communication process between the user terminal 10 and external devices such as the management server 20 according to a communication protocol such as Hypertext Transfer Protocol (HTTP). The browser program may be a dedicated application for executing a communication process between the user terminal 10 and the management server 20 according to a predetermined communication protocol.

The controller 11 includes a control device such as a CPU, a ROM, and a RAM. The CPU is a processor for executing various types of arithmetic processes. The ROM is a non-volatile storage in which a control program such as BIOS and OS for causing the CPU to execute various types of processes is stored in advance. The RAM is a volatile or non-volatile storage that stores various types of information, and is used as a temporary storage memory (working area) for various types of processes executed by the CPU. The controller 11 controls the user terminal 10 by causing the CPU to execute various types of control programs stored in advance in the ROM or the storage 13.

Specifically, the controller 11 functions as a browser processor 111 by executing various types of processes according to the browser program stored in the storage 13. The browser processor 111 causes the operation display 12 to display a page (sheet) of a shared file (document) provided from the management server 20 via the communication network N1 to execute the browser process in which the operation on the operation display 12 is input to the management server 20. That is, the user terminal 10 is capable of functioning as an operation terminal of the management server 20 as a result of the browser program being executed by the controller 11. Some or all of the processing operators included in the controller 11 may be configured by an electronic circuit.

For example, if a sharing application for sharing a file is installed in the user terminal 10, when a user of the user terminal 10 performs an operation for starting the sharing application, a login screen, a screen for selecting a shared file, and the like are displayed in the operation display 12. If the user operates the user terminal 10 to input login information and select a shared file, a sheet included in the shared file is displayed in the operation display 12. If the user operates the user terminal 10, the user switches a sheet (page) included in the shared file and inputs a comment, for example. If the user inputs the login information for a first time to be linked, an operation of inputting the login information from the next time onwards may be omitted.

For example, in the user terminal 10, if a user operation for making a request for an access to a predetermined URL corresponding to a file sharing site provided by the management server 20 is performed, the controller 11 may obtain data of a web page of the file sharing site from the management server 20 to display the web page in the operation display 12.

Management Server 20

As illustrated in FIG. 1, the management server 20 is a server including a controller 21, a storage 22, and a communicator 23. The management server 20 not only may be a single computer, but also may be a computer system in which a plurality of computers operate in cooperation. Various types of processes executed in the management server 20 may be executed in a distributed manner by one or more processors.

The communicator 14 is a communication interface for connecting the management server 20 to the communication network N1 in a wired or wireless manner to execute data communication, according to a predetermined communication protocol, between the communicator 14 and an external device such as the user terminal 10 via the communication network N1.

Figure 4:
FIG. 4 is a table showing an example of importance information utilized in the management server according to the embodiment of the present disclosure.

The storage 22 is a non-volatile storage including a hard disk drive (HDD), a solid state drive (SSD), or a flash memory that stores various types of information. In the storage 22, data such as user information D1, comment information D2, and importance information D3 is stored. FIG. 2 is a table showing an example of the user information D1, FIG. 3 is a table showing an example of the comment information D2, and FIG. 4 is a table showing an example of the importance information D3.

As illustrated in FIG. 2, in the user information D1, information items including "user ID" and "user icon ID" are registered for each user sharing a sheet (page). The user ID is user identification information. For example, if each user activates a sharing application for sharing a sheet and performs a login operation on the user terminal 10 of the user, the user ID (login ID) is registered in the "user ID". The user may perform the login operation for a first time only and may omit the login operation in subsequent logins. Here, the sheet is a page included in one file, for example, and if the file includes 10 pages, the file includes 10 sheets having a sheet S1 to a sheet S10. For example, the user activates the sharing application in the user terminal 10 to open a desired file and operates, for example, a page forward function on the 10 sheets having the sheet S1 to the sheet S10 included in the file to switch sheets displayed in the operation display 12. Each user performs a similar process to share the sheet. A plurality of users may display the same sheet in the user terminals 10 of the plurality of users or a plurality of users may display sheets different from each other in the user terminals 10 of the plurality of users. The file may include one sheet, or may include a plurality of sheets.

The "user icon ID" is identification information for identifying a user who inputs (adds) a comment on the sheet displayed in the operation display 12. The user icon ID is identification information corresponding to, for example, an icon image displayed in a different color for each user. For example, any color information is assigned to the "user icon ID" for registration in the order in which the user ID is registered. In FIG. 2, for example, the user IDs and the user icon IDs corresponding to users A, B, C, and D are registered.

As illustrated in FIG. 3, information items including "sheet ID", "comment ID", "user ID", "input date and time", "designated position", "comment content", and "category" are registered in the comment information D2, for each comment input (added) to the sheet. The "sheet ID" is identification information of a sheet. For example, "S001" is registered as the identification information of the sheet S1, and "S002" is registered as the identification information of the sheet S2. The "comment ID" is identification information of a comment input by a user on a sheet. The "input date and time" is information on a date and time when a user inputs a comment on a sheet. The "designated position" is position information indicating a position designated by a user on a sheet. For example, if the sheet is assumed to be an XY plane, a position designated by the user on the sheet, that is, coordinate information of an X-coordinate and a Y-coordinate of a position touched by a mouse, a touch pen, a finger, and the like is registered as the "designated position". The "comment content" is information on a comment input by a user. The comment is not limited to a text document and may be an image, a URL, a voice, or the like. The text document may be a document input with a keyboard or a document input with handwriting. The comment is an example of input information according to the present disclosure. The comment content is registered in association with the icon ID. The "category" is information indicating a type of comment, and includes "question", "accepted", "solved", "withheld", "rejected", and the like. Any one of the categories is assigned to each comment. For example, a user selects a desired category in inputting a comment. The controller 21 obtains information of the category assigned to the comment and registers the information in the comment information D2.

Figure 5:
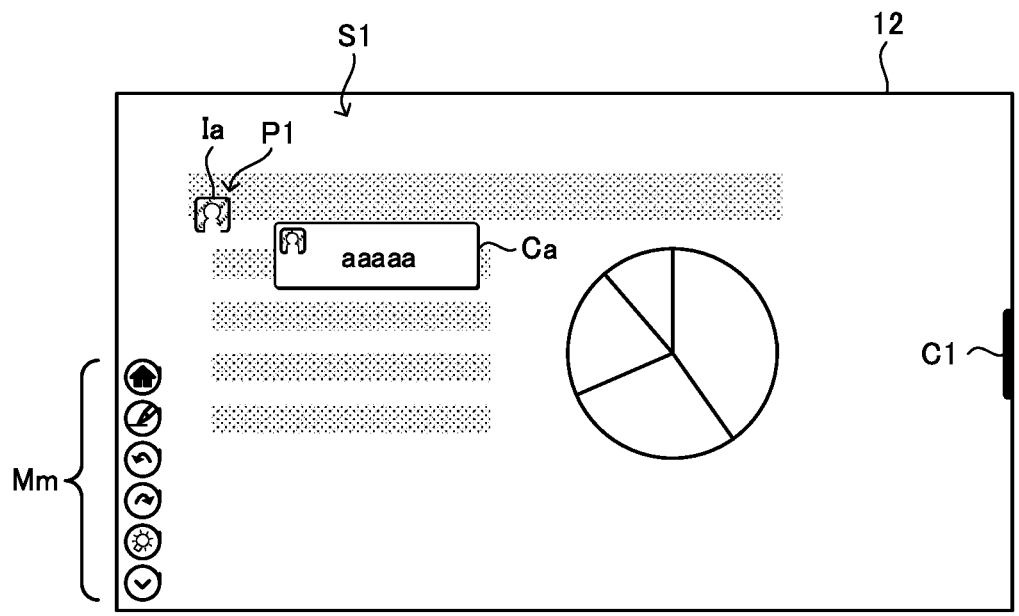
FIG. 5 is a diagram illustrating an example of a display screen displayed in a user terminal according to the embodiment of the present disclosure.
Figure 6:
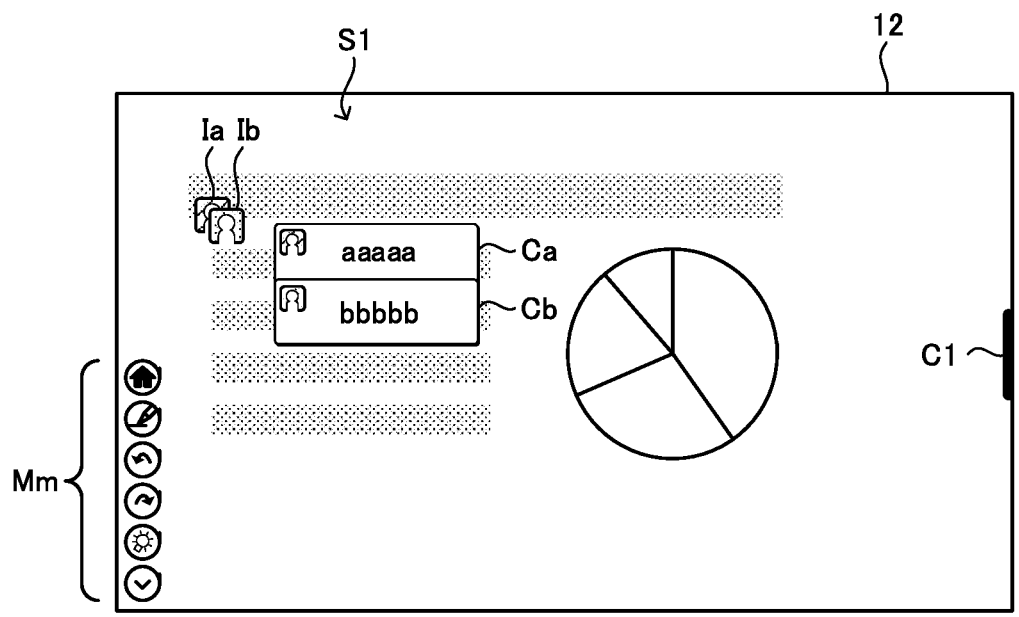
FIG. 6 is a diagram illustrating an example of the display screen displayed in the user terminal according to the embodiment of the present disclosure.

Here, if the user A designates a designated position P1 on the sheet S1 and inputs a comment Ca, an icon image Ia corresponding to the user A is displayed at the designated position P1 as illustrated in FIG. 5. Thereafter, if the user B touches the icon image Ia on the sheet S1, for example, it is possible to input a reply comment to the comment Ca associated with the icon image Ia, as illustrated in FIG. 6. A method of replying to the comment Ca is not limited to this example, and various methods may be employed. For example, if four icon images are displayed, that is, if one comment and three reply comments for the one comment are displayed, a reply comment may be input when a first icon image is touched by a user, and a reply comment may be input when any one of the other three icon images is touched by a user. If the user B inputs a comment Cb, an icon image Ib corresponding to the user B is displayed at the designated position P1. The icon image Ib is displayed so that, for example, a part of the icon image Ib overlaps the icon image Ia and is arranged on a front side of the icon image Ia. A method of displaying an icon image corresponding to a reply comment is not limited to this example. For example, the number of replies may be displayed in one icon image, or a plurality of icon images may be combined and displayed. The icon image is an example of an identification image of the present disclosure.

As illustrated in FIG. 4, information items including "sheet ID", "designated position", and "importance" are registered in the importance information D3 for each designated position. The "importance" is information indicating an importance of the designated position. The importance is determined by the controller 21, based on a comment input in the designated position and information of a user who inputs the comment. For example, the controller 21 evaluates the importance in five levels. In FIG. 4, in the sheet S1, "L5" having the highest importance is registered for the designated position P1, and "L1" having the lowest importance is registered for a designated position P2. In the sheet S2, "L5" having the highest importance is registered for a designated position P3. The controller 21 may determine an order of importance for a plurality of designated positions included in the sheet for each sheet, or may determine an order of importance for all designated positions included in all sheets. The importance is an example of a first importance of the present disclosure.

In the storage 22, data of a file (document) displayed in the user terminal 10 and the like are stored. The file is stored in the storage 22 if a user uploads a file that the user wishes to share with another user by using the sharing application, for example. The user who has logged in to the sharing application can browse a file stored in the storage 22 in the user terminal 10 of the user. If the other user already adds (posts) a comment, an icon image corresponding to the other user is displayed. The user can browse a content of the comment by clicking the icon image.

In the present embodiment, the controller 21 of the management server 20 may cause the controller 11 of the user terminal 10 to display a file by transmitting data necessary for displaying the file in the user terminal 10. The controller 21 of the management server 20 may cause the user terminal 10 to display a web page by generating the web page of the file sharing site and transmitting information of the generated web page to the user terminal 10.

In another embodiment, some or all of the information items such as the user information D1, the comment information D2, and the importance information D3 may be stored in a server accessible from the management server 20. In this case, the controller 21 of the management server 20 may acquire the information from the server and execute each process such as a display process (see FIG. 11) described later.

The storage 22 stores a control program such as a display program for causing the controller 21 to execute the display process (see FIG. 11) described later. For example, the display program is recorded non-temporarily on a computer-readable recording medium such as a USB, a CD, or a DVD, read by a reading device (not illustrated) such as a USB drive, a CD drive, or a DVD drive electrically connected to the management server 20, and stored in the storage 22. The display program may be downloaded from a server accessible from the management server 20 and stored in the storage 22. The display program is an example of an information processing program according to the present disclosure.

The controller 21 includes control devices such as a CPU, a ROM, and a RAM. The CPU is a processor for executing various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (working area) for various types of processes executed by the CPU. The controller 21 controls the management server 20 by causing the CPU to execute various types of control programs stored in advance in the ROM or the storage 22.

Specifically, as illustrated in FIG. 1, the controller 21 includes various types of process operators such as a reception processor 211, an acquisition processor 212, a first display processor 213, an importance determiner 214, and a second display processor 215. The controller 21 functions as the various types of process operators by causing the CPU to execute various types of processes according to the display program. Moreover, some or all of the processing operators may be configured by an electronic circuit. The display program may be a program for causing a plurality of processors to function as the processing operator. In the present disclosure, the storage medium in which the display program is stored and one or more processors are provided, and such a processor may execute each process described below executed by the reception processor 211, the acquisition processor 212, the first display processor 213, the importance determiner 214, and the second display processor 215.

The reception processor 211 receives a user operation via the user terminal 10. For example, if the user activates the sharing application and performs a login operation, the reception processor 211 receives the login operation. In receiving the login operation, the reception processor 211 acquires the user ID and registers the acquired user ID in the user information D1 (see FIG. 2) of the storage 22. The reception processor 211 associates the user ID with the user icon ID and registers the resultant user ID in the user information D1.

If the user selects a desired file in the user terminal 10, the reception processor 211 receives the selection operation. The reception processor 211 receives various types of operations such as an operation for designating a position where the user inputs a comment in the sheet S1 displayed in the operation display 12 of the user terminal 10, an operation for inputting a comment, and an operation for turning a page.

The reception processor 211 executes various types of processes according to the operations. For example, if receiving an operation for selecting a file from the user terminal 10, the reception processor 211 causes the operation display 12 of the user terminal 10 to display the sheet S1 of the file. Another example is that in receiving an operation for designating a position in the sheet S1 from the user terminal 10, the reception processor 211 causes the operation display 12 of the user terminal 10 to display a comment input field (comment box) in which a comment is input. FIG. 5 illustrates an example of the sheet S1 displayed in the operation display 12 of the user terminal 10. Although the icon image Ia of the user A and the comment Ca of the user A are included in FIG. 5, these are displayed according to an input operation (described later) of the user A.

In a display screen illustrated in FIG. 5, a main menu Mm is displayed. The main menu Mm includes a plurality of function icons to which predetermined functions are assigned. The plurality of function icons include a plurality of attribute icons to which a function for setting an attribute (a color, a thickness, a type, and the like) of a touch pen, for example, is assigned.

The acquisition processor 212 acquires position information (coordinate information) of a designated position designated by each of a plurality of users on the sheet displayed in the operation display 12, identification information (a user ID) of the user, and a comment (input information) input by the user. The acquisition processor 212 is an example of an acquisition processor of the present disclosure. For example, if the user A designates an arbitrary position (designated position P1) of the sheet S1 in the user terminal 10 to input the comment Ca ("aaaaa") in the comment input field (comment box), the acquisition processor 212 acquires the position information of the designated position P1, the user ID ("U001") of the user A, and the comment Ca ("aaaaa"). The acquisition processor 212 registers, in the comment information D2 (see FIG. 3), the acquired user ID ("U001") of the user A and comment Ca ("aaaaa") in association with the sheet S1 ("S001") and the designated position P1. The acquisition processor 212 acquires the input date and time of the comment Ca from the user terminal 10 and registers the acquired input date and time in the comment information D2 (see FIG. 3). The acquisition processor 212 acquires the position information of the designated position, the user ID, and the comment every time the user inputs the comment.

The first display processor 213 displays an icon image corresponding to the user ID acquired by the acquisition processor 212 at the position corresponding to the designated position in the sheet. The first display processor 213 is an example of a first display processor according to the present disclosure. For example, as illustrated in FIG. 5, the first display processor 213 displays the icon image Ia of the user icon ID "I001" corresponding to the user ID "U001" of the user A acquired by the acquisition processor 212, at the designated position P1 in the sheet. Specifically, if the user A touches (clicks) an arbitrary position in the sheet, the first display processor 213 displays the icon image Ia of the user A and the comment input field (comment box) at the designated position. If the user A inputs the comment Ca ("aaaaa") in the comment input field, the acquisition processor 212 acquires the comment Ca, and the first display processor 213 displays the comment Ca in the comment input field.

If the user B touches the icon image Ia in the sheet S1 illustrated in FIG. 5, the first display processor 213 displays the icon image Ib of the user B and the comment input field at the designated position. For example, the first display processor 213 displays the icon image Ib so that the icon image Ib partially overlaps the icon image Ia and is arranged at the front side of the icon image Ia. The first display processor 213 displays the comment input field below the comment Ca. If the user B inputs the comment Cb ("bbbbbb") in the comment input field, the acquisition processor 212 acquires the comment Cb, and the first display processor 213 displays the comment Cb in the comment input field.

The first display processor 213 displays the comment corresponding to the user ID acquired by the acquisition processor 212 at the position corresponding to the designated position in the sheet. For example, as illustrated in FIG. 5, the first display processor 213 displays, near the designated position P1, the comment Ca "C001" corresponding to the user ID "U001" of the user A acquired by the acquisition processor 212. The first display processor 213 displays the icon image Ia in association with the comment Ca in the comment input field. For example, as illustrated in FIG. 6, the first display processor 213 displays, near the designated position P1, the comment Cb "C002" corresponding to the user ID "U002" of the user B acquired by the acquisition processor 212. The first display processor 213 also displays the icon image Ib in association with the comment Cb in the comment input field.

Figure 7:
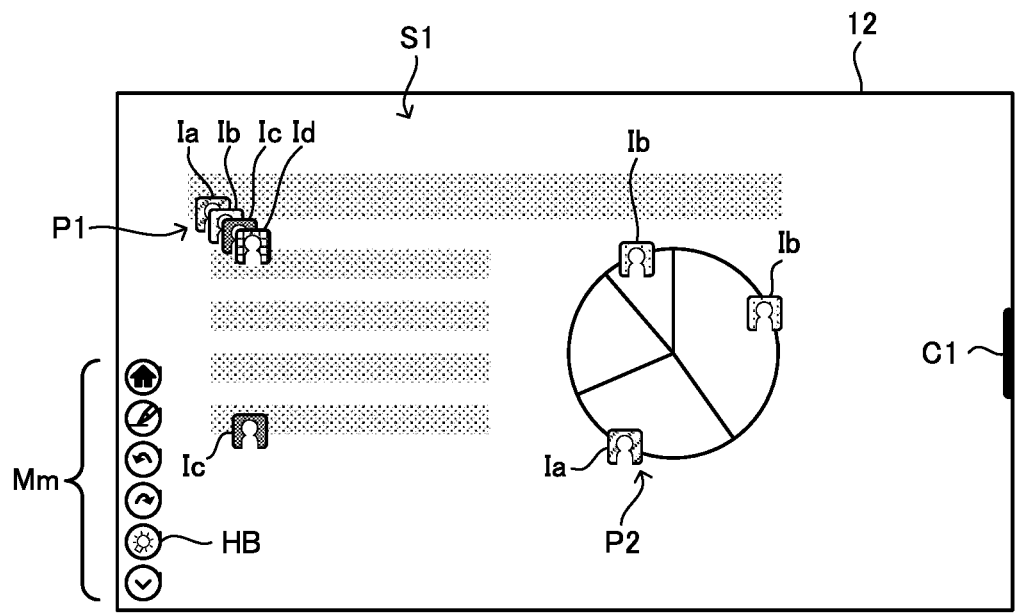
FIG. 7 is a diagram illustrating an example of the display screen displayed in the user terminal according to the embodiment of the present disclosure.

The first display processor 213 may not display the comment on the sheet S1. FIG. 7 illustrates an example of the sheet S1 in which a plurality of comments are input by a plurality of users A, B, C, and D. For example, the comment Ca of the user A, the reply comment Cb of the user B to the comment Ca, a reply comment Cc of the user C, and a reply comment Cd of the user D are associated at the designated position P1. As illustrated in FIG. 7, the first display processor 213 may display the icon image in the sheet S1 displayed in the operation display 12 and omit displaying (may not display) the comment. In a case where the comment is not displayed, for example, if an icon image is selected by a user, the first display processor 213 may display the comment and the reply comment corresponding to the icon image. The first display processor 213 may select a display mode in which the comment is temporarily hidden, or may display the comment in a reduced size.

Figure 8:
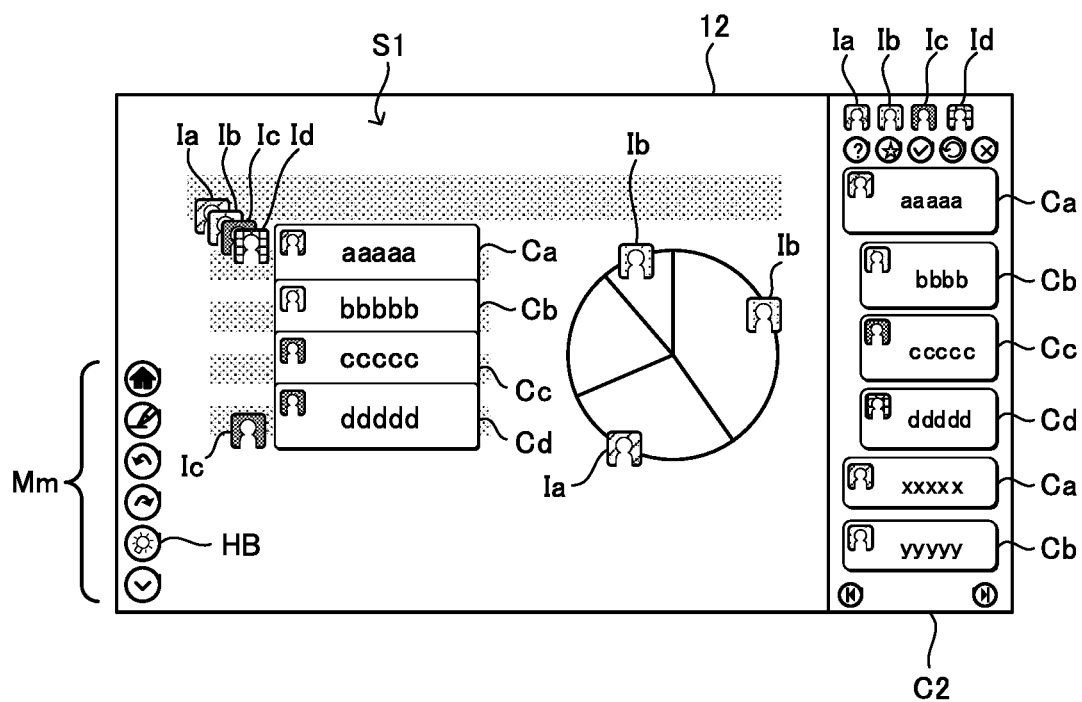
FIG. 8 is a diagram illustrating an example of the display screen displayed in the user terminal according to the embodiment of the present disclosure.

Here, a comment display button C1 may be displayed in the display screen. For example, if the user selects the comment display button C1 in the user terminal 10, the first display processor 213 displays a comment list C2 at a part of the display screen (for example, at a right end portion), as illustrated in FIG. 8. In the comment list C2, all the comments included in the sheet S1 are displayed. In the comment list C2, the reply comments Cb, Cc, and Cd to the comment Ca are displayed in association with the comment Ca (for example, displayed as a tree).

For example, if the user selects (clicks) any one of the icon images displayed at the designated position P1 in the user terminal 10, in the sheet S1 illustrated in FIG. 7, the first display processor 213 displays all the comments Ca, Cb, Cc, and Cd associated with the designated position P1, as illustrated in FIG. 8. In the sheet S1, the first display processor 213 displays the comment or omits displaying the comment according to a user operation.

The first display processor 213 transmits display data to each of the plurality of user terminals 10 displaying the same sheet to update a display content in the operation display 12 of each of the plurality of user terminals 10. As a result, the display screens are synchronized in the plurality of user terminals 10 displaying the same sheet so that a common display content is provided.

The importance determiner 214 determines an importance (a first importance of the present disclosure) for each designated position in the sheet, based on the user ID and the comment acquired by the acquisition processor 212. The importance determiner 214 is an example of an importance determiner of the present disclosure.

Specifically, the importance determiner 214 calculates a total number of comments (comment count) for each designated position in the sheet, and determines to increase the importance as the calculated comment count is higher. For example, in the sheet S1 illustrated in FIG. 7, the comment count at the designated position P1 is "4", and the comment count at another designated position (for example, at the designated position P2) is "1". In this case, the importance determiner 214 determines the importance at the designated position P1 having the highest comment count to be "L5" being the highest, and determines the importance at another designated position (for example, at the designated position P2) having the lowest comment count to be "L1" being the lowest. Thus, it is possible to determine that a part having a high comment count to be a part where a discussion is actively debated, and thus, it is determined to increase the importance. The importance determiner 214 registers the importance of a determination result in the importance information D3 (see FIG. 4) of the storage 22. It is noted that if a plurality of comments are associated with the same designated position, it is possible to determine that these comments are the reply comments, and thus, the importance determiner 214 may determine the importance, based on a reply comment count at each designated position.

In another embodiment, the importance determiner 214 may determine to increase the importance as the number of users inputting a comment corresponding to a designated position is larger. Here, a case where comments are exchanged among a small number of users and a case where comments are exchanged among a large number of users may be considered. For example, if a comparison is made between a case where there are four comments as a result of two users inputting comments and a case where there are four comments as a result of four users inputting comments, it is possible to determine that the discussion is more actively debated when there are a larger number of users. Therefore, the importance determiner 214 may determine the importance at a designated position with a larger number of users to be higher than the importance at a designated position with a smaller number of users.

In another embodiment, the importance determiner 214 may determine to increase the importance as a user inputting a comment corresponding to a designated position has a higher managerial position. For example, if a managerial position of the user C inputting the comment Cc is "President", "Executive", "Manager", and the like, the importance determiner 214 determines the importance at the designated position designated by the user C to be "L5" which is the highest importance.

The importance determiner 214 may determine the importance for each designated position by combining the above-described forms.

If the shared file includes a plurality of sheets, the importance determiner 214 determines the importance for each sheet, based on the importance for each designated positions in each sheet (an example of a second importance of the present disclosure). For example, the importance determiner 214 determines the importance of a sheet having a larger number of designated positions having a higher importance to be higher than a sheet having a smaller number of designated positions having a higher importance. For example, the importance determiner 214 may determine the importance of the sheet in the order of a total comment count for each sheet. The importance determiner 214 sets a rank according to the importance for each of the plurality of sheets included in the shared file.

The second display processor 215 causes the operation display 12 of the user terminal 10 to display a list display screen for displaying a list of a plurality of sheets. Specifically, for example, in the display screen in which the sheet S1 illustrated in FIG. 7 is displayed, if the user A selects (clicks) an important display button HB included in the main menu Mm, the second display processor 215 displays, in the user terminal 10 of the user A, a predetermined sheet to which a comment is added, out of all the sheets included in the shared file. For example, the second display processor 215 displays, in the user terminal 10, a list of top seven sheets S1 to S7 (for example, in a thumbnail display) in the descending order of the importance (see FIG. 9), based on the importance of the sheet (see FIG. 4) determined by the importance determiner 214. For example, the second display processor 215 may display a list of a plurality of sheets in the user terminal 10 in the descending order of the importance of comments included in the plurality of sheets. The second display processor 215 may display the same duplicate sheets. In this case, the position information items of the important comment in each of the plurality of the duplicate sheets differ from one another. Thus, the second display processor 215 may display a list of the plurality of sheets, based on the importance of each of the sheets, or may display a list of the plurality of sheets, based on the importance of the comment.

The second display processor 215 may display each of the sheets in a thumbnail format in a display mode according to the importance. For example, the second display processor 215 displays a sheet having a high importance in a larger size than a sheet having a low importance.

The second display processor 215 displays an object image Hm indicating an important part in the sheet in association with the designated position, based on the importance determined by the importance determiner 214. The second display processor 215 is an example of a second display processor according to the present disclosure. The object image Hm is an image (mark) having an indication allowing the user to recognize, in the user terminal 10 in which the sheet is displayed, the designated position (important part) having the highest importance in the sheet. The second display processor 215 displays the object image Hm at the position corresponding to the designated position having the highest importance for each sheet in the list display screen.

Specifically, for example, the second display processor 215 displays the object image Hm at a position corresponding to the designated position P1 having the highest importance determined by the importance determiner 214, from among the plurality of designated positions. For example, in a list display screen illustrated in FIG. 9, the second display processor 215 displays the object image Hm having a circular (ellipsoidal) shape to surround the designated position P1. The object image Hm is not limited to a circle image, and may be an arrow (pointer) image, an indicating line image, or the like. For example, the second display processor 215 may display the object image Hm at positions, from among the plurality of designated positions, corresponding to the top three designated positions with the high importance determined by the importance determiner 214. In this case, a size, a color, a shape, and the like of each object image Hm corresponding to each designated position may be differed from one another.

In the list display screen, the second display processor 215 may extract a part in the sheet to which the object image Hm is added, for example, an area surrounded by the object image Hm and display the extracted part in an enlarged manner. This allows the user to grasp not only the position of the important part but also a content of the important part in the list display screen.

Figure 9:
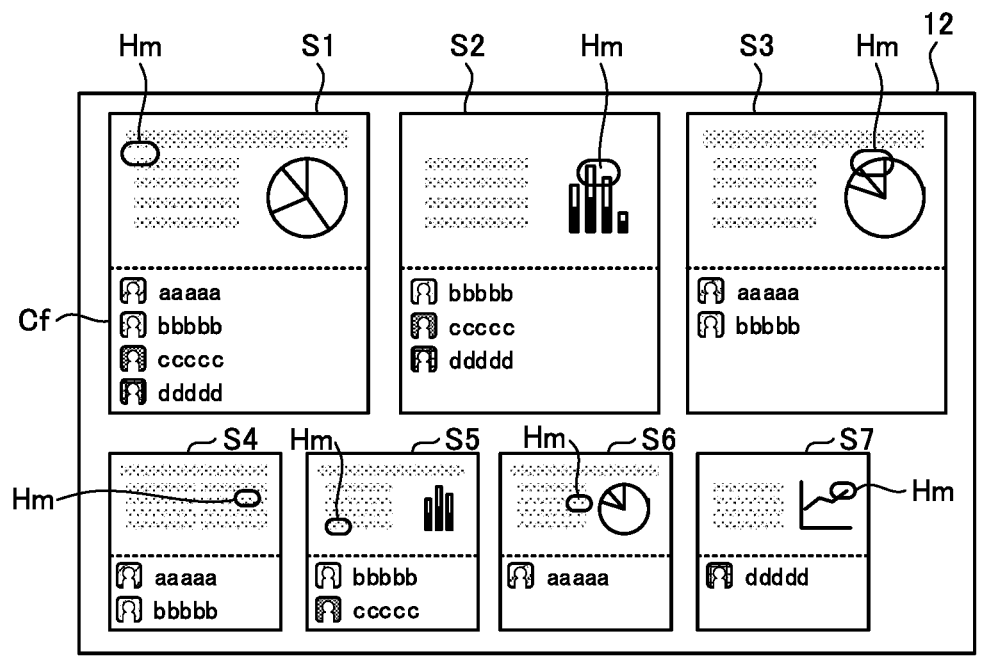
FIG. 9 is a diagram illustrating an example of the display screen displayed in the user terminal according to the embodiment of the present disclosure.

In the list display screen, the second display processor 215 may display the icon image corresponding to the user ID associated with the designated position having the highest importance and at least a part of the comment associated with the designated position, in association with the sheet. For example, as illustrated in FIG. 9, in the list display screen, the second display processor 215 displays a comment field Cf below the thumbnail image in each sheet, and displays a predetermined comment in the comment field Cf. For example, the second display processor 215 displays, in the sheet, at least a comment having the oldest input date and time input by a user and a comment having the newest input date and time, from among the plurality of comments associated with the designated position P1 having the highest importance in the sheet S1, in association with the sheet. For example, the second display processor 215 displays, from among the plurality of comments associated with the designated position P1 of the sheet S1, the comment Ca having the oldest input date and time and a comment Cd having the newest input date and time, in the comment field Cf. This allows a user who browses the list display screen to grasp the important part and to grasp a discussion comment (the comment Ca) and a conclusion comment (the comment Cd) corresponding to the important part, for example.

The second display processor 215 may be configured to switch which importance to be displayed by a switch button. For example, the second display processor 215 displays a plurality of sheets in a list format, based on the importance of the plurality of comments to which the category selected by a user, from among the plurality of categories (see FIG. 3), is assigned.

Figure 10:
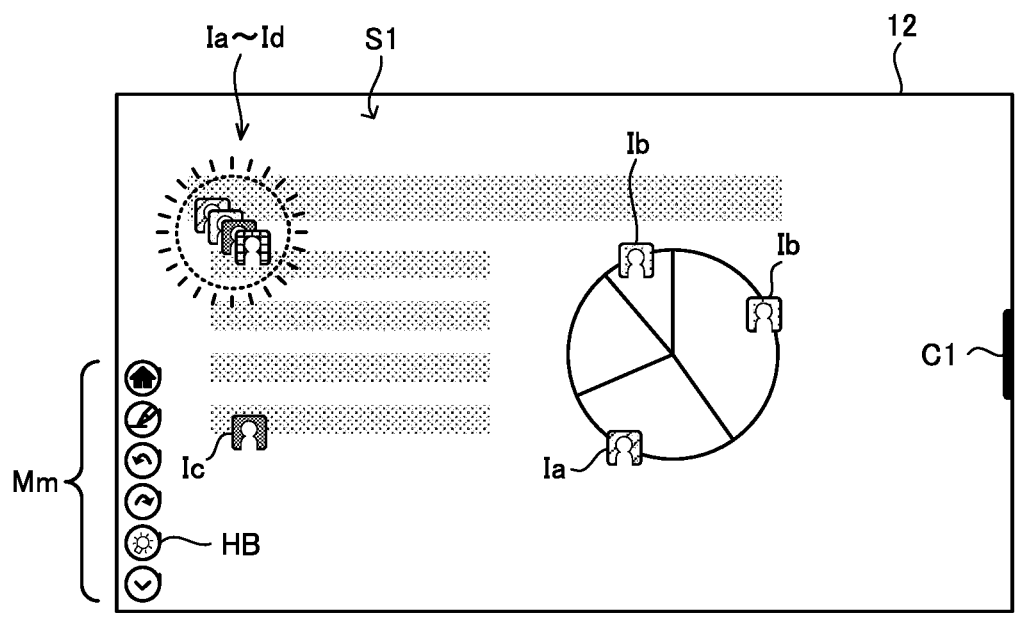
FIG. 10 is a diagram illustrating an example of the display screen displayed in the user terminal according to the embodiment of the present disclosure.

Here, if the user selects (clicks) the thumbnail image of a desired sheet in the list display screen (see FIG. 9), the second display processor 215 causes the user terminal 10 to display the sheet corresponding to the selected thumbnail image in an enlarged manner. For example, if the user selects the thumbnail image of the sheet S1 in the list display screen (see FIG. 9), the second display processor 215 causes the user terminal 10 to display the sheet S1 in an enlarged manner, as illustrated in FIG. 10. The second display processor 215 displays the designated position P1 in an emphasized manner in the display screen of the sheet S1 so that the user can recognize the designated position P1. For example, the second display processor 215 highlights (for example, blinks) icon images Ia, Ib, Ic, and Id corresponding to the designated position P1 for a predetermined time period (for example, for five seconds). This allows the user to easily grasp the important part in the sheet S1.

The importance determiner 214 may determine the importance of the designated position corresponding to a comment each time a user inputs the comment, and may register or update the importance in the importance information D3 (see FIG. 4). Further, the importance determiner 214 may determine the importance, based on the comment information D2 (see FIG. 3) at that point each time the important display button HB is selected, and may register or update the importance in the importance information D3 (see FIG. 4).

Display Process

Figure 11:
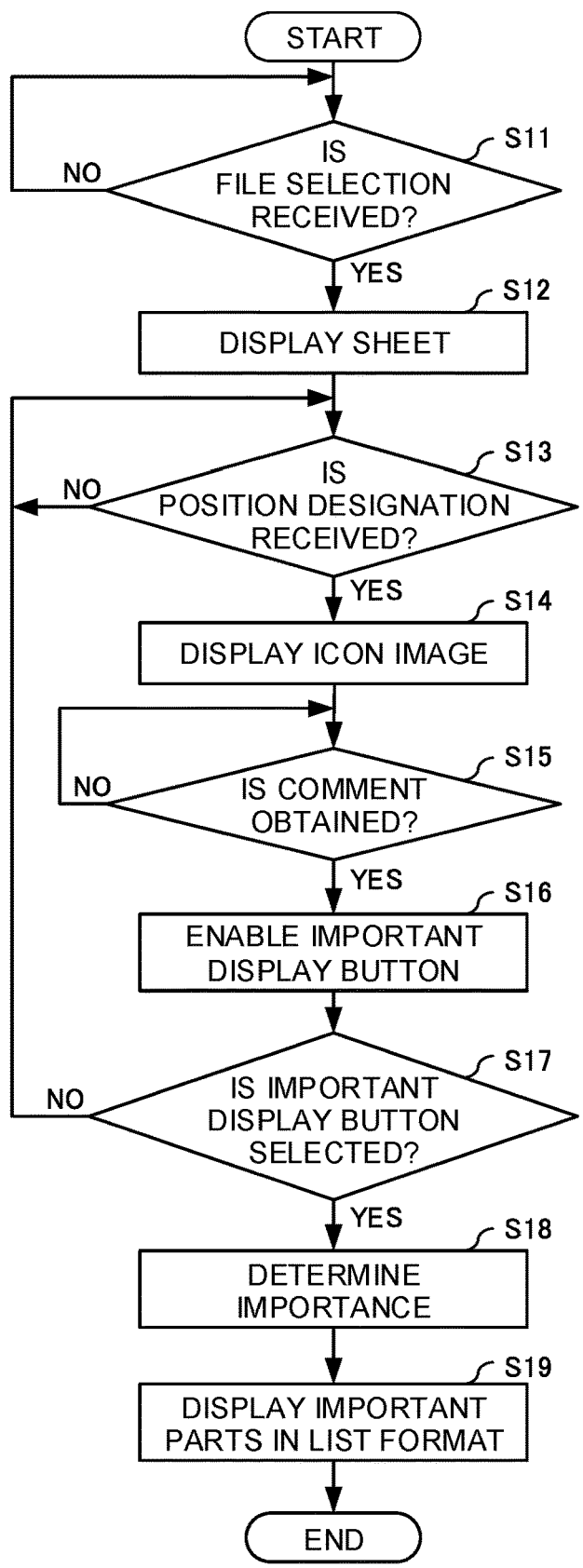
FIG. 11 is a flowchart for explaining an example of a procedure of a display process executed in the management server according to the embodiment of the present disclosure.

A display process executed in the management server 20 will be described below with reference to FIG. 11. Specifically, in the present embodiment, the display process is executed by the controller 21 of the management server 20. The controller 21 simultaneously executes the display process for each user terminal 10.

The present disclosure can be regarded as an invention of an information processing method in which one or more steps included in the display process are executed. Further, one or more steps included in the display process described herein may be omitted where appropriate. In addition, each of the steps in the display process may be executed in a different order as long as a similar operation and effect is obtained. Here, a case where each of steps in the display process is executed by the controller 21 will be described as an example, however, another embodiment may be an information processing method in which each of the steps in the display process is executed in a distributed manner by one or more processors.

First, in step S11, the controller 21 determines whether selection of a file (shared file) is received in the user terminal 10. If the controller 21 acquires an operation information on the file selection from the user terminal 10 (S11: YES), the processing proceeds to step S12. The controller 21 waits until the operation information is acquired from the user terminal 10.

In step S12, the controller 21 transmits data of the selected file to the user terminal 10 and displays, in the operation display 12, a predetermined sheet (for example, the first sheet S1 on page 1) included in the file. As a result, the sheet S1 is displayed in the operation display 12 of the user terminal 10.

Next, in step S13, the controller 21 determines whether an arbitrary position is designated (clicked) by a user in the sheet. If the arbitrary position is designated (S13: YES), the processing proceeds to step S14. The controller 21 waits until the arbitrary position is designated.

In step S14, the controller 21 causes the user terminal 10 to display an icon image at the designated position in the sheet. In the above example, in each of the user terminals 10, the controller 21 displays the icon image Ia corresponding to the user A at the designated position P1 of the sheet S1 (see FIG. 5). The controller 21 displays a comment input field near the designated position. Specifically, if receiving an operation for designating a position at which a comment is input in the sheet S1 displayed in the user terminal 10, the controller 21 causes the operation display 12 of the user terminal 10 to display the comment input field in which the comment is input. Step S14 is an example of a first display process according to the present disclosure.

Next, in step S15, the controller 21 determines whether the comment input by the user in the sheet is acquired. If a comment is input in the comment input field in the user terminal 10, the controller 21 acquires information on the comment from the user terminal 10. For example, if the comment Ca is input in the sheet S1 in the user terminal 10 of the user A, the controller 21 acquires information items including the comment Ca, the designated position P1 of the comment Ca, the user ID of the user A, and the input date and time of the comment Ca. The controller 21 registers each of the acquired information items in the comment information D2 (see FIG. 3). Step S13 is an example of an acquisition process according to the present disclosure. It is noted that if the user performs a file saving operation after the comment is input, each of the information items on the comment is overwritten to be associated with the file.

Next, in step S16, the controller 21 activates the important display button HB in the user terminal 10. That is, the controller 21 enables an operation of selecting the important display button HB in the user terminal 10.

In step S17, the controller 21 determines whether the important display button HB is selected. If the important display button HB is selected (S17: YES), the processing proceeds to step S18. If the important display button HB is not selected (S17: NO), the process returns to step S13 to repeat the above processes. If a comment is input in each of the plurality of user terminals 10, the controller 21 acquires each comment, and based on the comment information D2, transmits display data to each of the user terminals 10 to update the content of the display screen. (see FIG. 7).

In step S18, the controller 21 determines the importance of each designated position. For example, the controller 21 calculates the comment count for each designated position, and determines to increase the importance as the calculated comment count is higher. Step S18 is an example of an importance determination process according to the present disclosure.

Next, in step S19, the controller 21 causes the operation display 12 of the user terminal 10 to display a list display screen for displaying the plurality of sheets in a list format, and to display the object image Hm indicating the important part in the sheet, based on the determined importance, in association with the designated position. For example, as illustrated in FIG. 9, the controller 21 displays a list of thumbnail images of the top seven sheets S1 to S7 having the highest comment count from among the sheets S1 to S10 included in the file, and displays, in each of the seven sheets, the object image Hm being an object image surrounding the designated position having the highest comment count. This allows the user to easily recognize the important part in each of the sheets. Step S19 is an example of a second display process according to the present disclosure.

If a predetermined thumbnail image is selected by the user in the display screen illustrated in FIG. 9, the controller 21 displays, in the user terminal 10, in an enlarged manner, the sheet S1 corresponding to the selected thumbnail image and displays, in an emphasized manner (displays in a blinking manner, for example), the icon image corresponding to the designated position of the object image Hm.

Thus, the management server 20 acquires the position information of the designated position designated by each of the plurality of users in the sheet displayed in each of the user terminals 10, the user ID of the user, and the comment input by the user, and displays the icon image corresponding to the acquired user ID at the position corresponding to the designated position in the sheet. The management server 20 determines, based on the acquired user ID and comment, the importance for each designated position in the sheet, and displays, based on the determined importance, the object image indicating the important part in the sheet in association with the designated position. This eliminates a labor, from the user, for searching for an important part in the sheet such as a part where the discussion is actively debated and a part where there are many discussions concentrated, and as a result, it is possible to grasp the important part at a glance (intuitively). Therefore, for example, if a plurality of meeting participants perform reviews after the meeting, it is possible to easily grasp an important part where the discussion is actively debated in the meeting.

The present disclosure is not limited to the above-described embodiment. Other embodiments of the present disclosure will be described below.

In another embodiment, as illustrated in FIG. 8, the controller 21 may display the icon images corresponding to all users sharing the sheet S1 in the comment list C2. A sorting function is applied to the icon images. For example, as illustrated in FIG. 12, if a user selects the icon image Ib of the user B in the comment list C2, the first display processor 213 displays only the comment Cb of the user B in the comment list C2.

Figure 12:
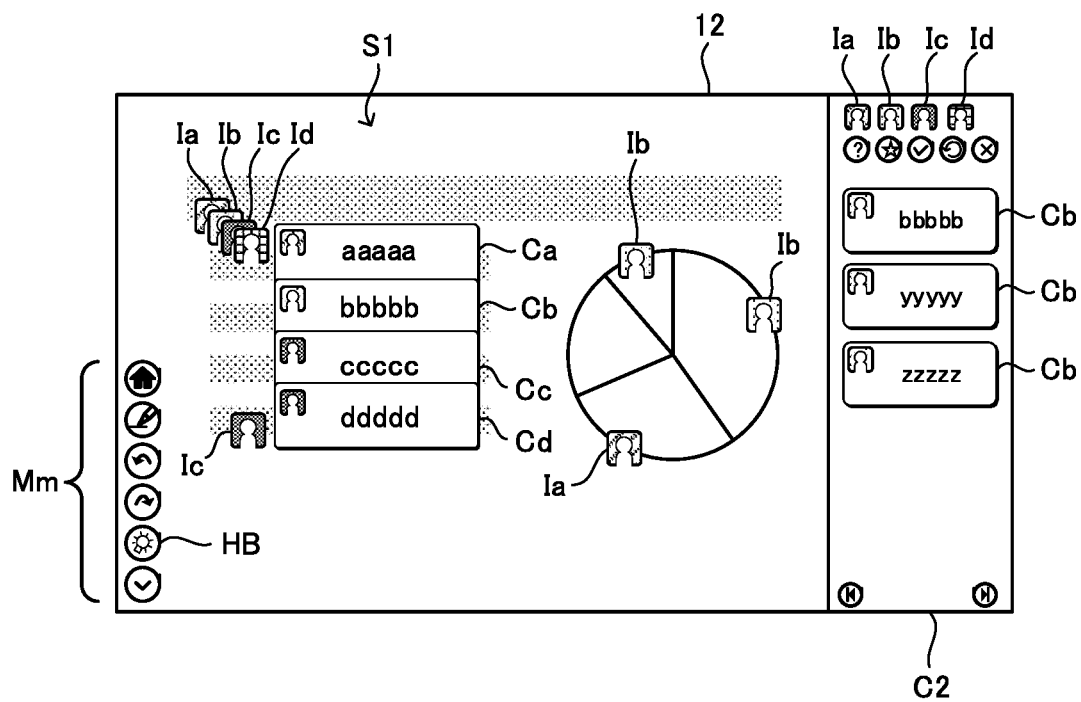
FIG. 12 is a diagram illustrating an example of the display screen displayed in the user terminal according to the embodiment of the present disclosure.
Figure 13:
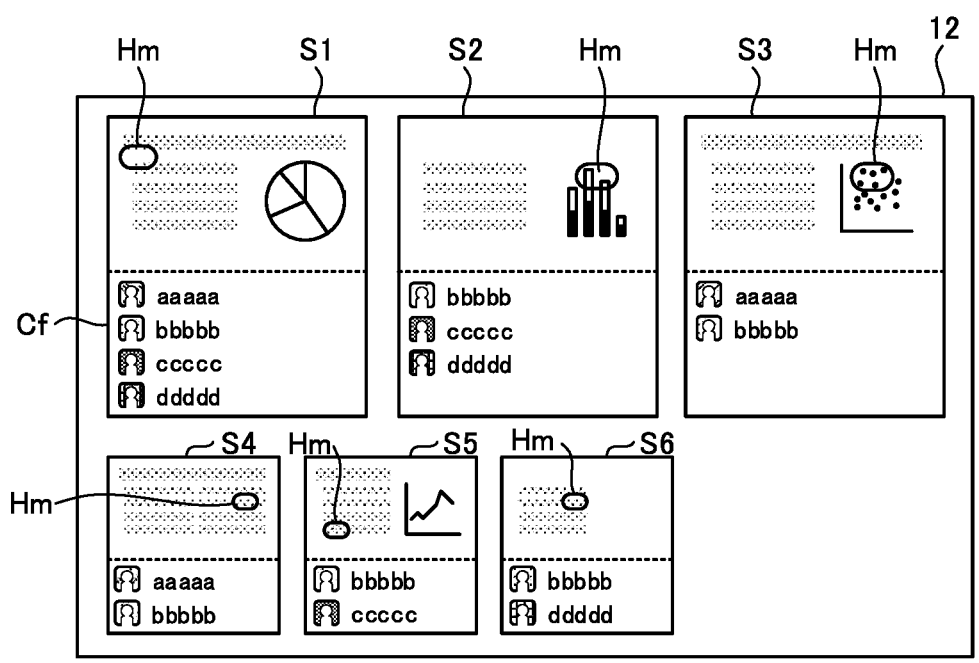
FIG. 13 is a diagram illustrating an example of the display screen displayed in the user terminal according to the embodiment of the present disclosure.

If the user further selects the important display button HB in the display screen illustrated in FIG. 12, as illustrated in FIG. 13, the second display processor 215 causes the user terminal 10 to display a list of the sheets added with the comment Cb of the user B, from among all the sheets included in the shared file. The importance determiner 214 determines the importance for the position designated by the user B, based on the comment count. Based on the importance for each sheet determined by the importance determiner 214 (see FIG. 4), the second display processor 215 causes the user terminal 10 to display (for example, in a thumbnail display) the top six sheets S1 to S6, from among the sheets added with the comment Cb of the user B (see FIG. 13). The second display processor 215 displays the object image Hm indicating the important part in each of the sheets S1 to S6 in association with the designated position, based on the importance determined by the importance determiner 214 (see FIG. 13).

The second display processor 215 may cause the user terminal 10 to display a plurality of sheets, based on the importance for each comment determined by the importance determiner 214. For example, the second display processor 215 may align and display seven sheets in the descending order of the importance of the comment Cb included in the sheets, from among the sheets added with the comment Cb of the user B. At this time, the same duplicate sheets may be displayed in the six sheets. In this case, the position information items of the important comment are different from one another in the plurality of duplicate sheets.

This allows the user to easily grasp an important part where the discussion involves a specific user, in a meeting review, for example.

Figure 14:
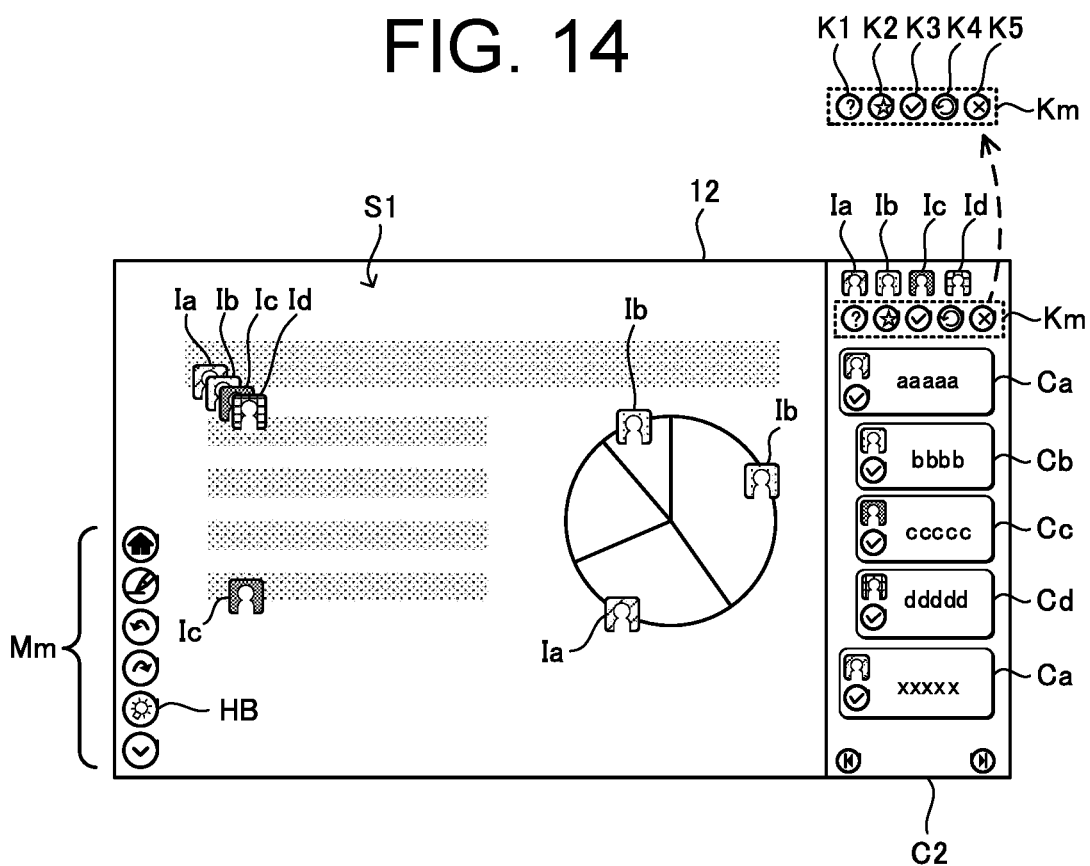
FIG. 14 is a diagram illustrating an example of the display screen displayed in the user terminal according to the embodiment of the present disclosure.

In another embodiment, as illustrated in FIG. 14, the controller 21 may display a category menu Km for selecting a category of the comment content in the comment list C2. The category menu Km includes, for example, a category image K1 for "question", a category image K2 for "approved", a category image K3 for "resolved", a category image K4 for "withheld", and a category image K5 for "rejected". Any category is assigned to a comment input by a user. For example, a user selects a desired category in inputting a comment. The controller 21 acquires information of the category assigned to the comment and registers the acquired information in the comment information D2 (see FIG. 3).

A sorting function is applied to the category images in the category menu Km. For example, as illustrated in FIG. 14, if a user selects the category image K3 of "resolved" in the comment list C2, the first display processor 213 displays only a comment assigned with the category of "resolved" in the comment list C2.

Figure 15:
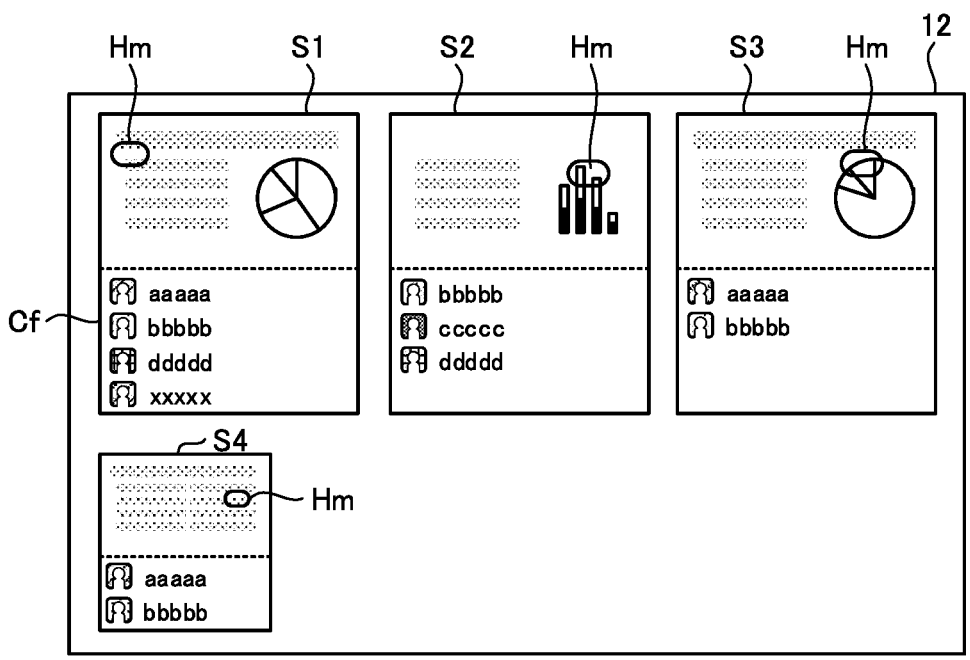
FIG. 15 is a diagram illustrating an example of the display screen displayed in the user terminal according to the embodiment of the present disclosure.

If the user further selects the important display button HB in the display screen illustrated in FIG. 14, as illustrated in FIG. 15, the second display processor 215 causes the user terminal 10 to display a list of the sheets added with a comment associated with the category of "resolved", from among all the sheets included in the shared file. The importance determiner 214 determines the importance for the designated position of the comment added with the category of "resolved", based on the comment count. Based on the importance for each sheet or the importance of the comment determined by the importance determiner 214 (see FIG. 4), the second display processor 215 causes the user terminal 10 to display (for example, in a thumbnail display) the top four sheets S1 to S4, from among the sheets added with a comment associated with the category of "resolved" (see FIG. 15). The second display processor 215 displays the object image Hm indicating the important part in each of the sheets S1 to S4 in association with the designated position, based on the importance determined by the importance determiner 214 (see FIG. 15).

This makes it possible to extract and easily grasp the important part corresponding to a specific category. In the above example, for example, the user can grasp the important part where the discussion is resolved in the meeting review.

It is noted that the information processing apparatus according to the present disclosure may also be realized by the user terminal 10. In this case, each of the user terminals 10 is configured to include, for example, each processing operator of the controller 21 of the management server 20. Each of the user terminals 10 may store the user information D1, the comment information D2, and the importance information D3. A server accessible from the user terminal 10 may store the user information D1, the comment information D2, and the importance information D3, and the user terminal 10 may acquire the information from the server to execute the display process (see FIG. 11).

The information processing apparatus of the present disclosure may also be realized by the management server 20 and the user terminal 10. In this case, each of the user terminals 10 is configured to include some processing operators (for example, the reception processor 211, the first display processor 213, and the second display processor 215) of the controller 21 of the management server 20.

It is noted that, in the information processing apparatus according to the present disclosure, within the scope of the invention described in claims, the embodiments described above may be freely combined, or the embodiments may be appropriately modified or some of the embodiments may be omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An information processing apparatus comprising:
an acquisition processor that acquires position information on a plurality of designated positions designated by each of a plurality of users, in a sheet displayed in a display, identification information of each of the plurality of users, and input information input by each of the plurality of users;

a first display processor that displays an identification image corresponding to the identification information acquired by the acquisition processor at positions corresponding to the plurality of designated positions in the sheet;

an important designated position determination processor that calculates a total number of pieces of input information for each of the plurality of designated positions in the same sheet, based on the identification information and the input information acquired by the acquisition processor, and determines, as an important designated position, at least one designated position at which a largest number of pieces of input information in the sheet have been input; and a second display processor that displays, as an object image, a line image surrounding an important part that is a region corresponding to the important designated position determined by the important designated position determination processor.

2. The information processing apparatus according to claim 1, wherein the second display processor displays the object image at a position corresponding to the designated position determined by the important designated position at which the largest number of pieces of input information have been input, from among the plurality of the designated positions.

3. The information processing apparatus according to claim 2, wherein the second display processor displays, in the display, a list display screen for displaying a plurality of the sheets in a list format, and displays, in the list display screen, the object image at a position corresponding to the designated position at which the largest number of pieces of input information have been input, for each of the plurality of sheets.

4. The information processing apparatus according to claim 3, wherein in the list display screen, the second display processor displays the identification image corresponding to the identification information associated with the designated position at which the largest number of pieces of input information have been input and at least a part of the input information associated with the designated position, in association with the sheet.

5. The information processing apparatus according to claim 4, wherein the second display processor displays at least the input information having an oldest input date and time input by each of the plurality of users and the input information having a newest input date and time, in association with the sheet, from among a plurality of the input information items associated with the designated position at which the largest number of pieces of input information have been input.

6. The information processing apparatus according to claim 3, wherein the important designated position determination processor further determines a total number of pieces of input information for each of the plurality of sheets, based on the total number of pieces of input information for every designated position in the sheet, and the second display processor displays the plurality of sheets in the list display screen, based on the total number of pieces of input information for each of the plurality of sheets determined by the important designated position determination processor.

7. The information processing apparatus according to claim 1, wherein the object image is an image indicating the designated position at which the largest number of pieces of input information have been input.

8. The information processing apparatus according to claim 1, wherein the second display processor extracts the region surrounded by the object image, and displays the extracted region in an enlarged manner.

9. An information processing method, executed by one or more processors, comprising:

acquiring position information on a plurality of designated positions designated by each of a plurality of users, in a sheet displayed in a display, identification information of each of the plurality of users, and input information input by each of the plurality of users;

displaying an identification image corresponding to the identification information acquired at positions corresponding to the plurality of designated positions in the sheet;

calculating a total number of pieces of input information for each of the plurality of designated positions in the same sheet, based on the identification information and the input information acquired, and determining, as an important designated position, at least one designated position at which a largest number of pieces of input information in the sheet have been input; and displaying, as an object image, a line image surrounding an important part that is a region corresponding to the important designated position.

10. A non-transitory storage medium for storing an information processing program for causing one or more processors to execute:

acquiring position information on a plurality of designated positions designated by each of a plurality of users, in a sheet displayed in a display, identification information of each of the plurality of users, and input information input by each of the plurality of users;

displaying an identification image corresponding to the identification information acquired at positions corresponding to the plurality of designated positions in the sheet;

calculating a total number of pieces of input information for each of the plurality of designated positions in the same sheet, based on the identification information and the input information acquired, and determining, as an important designated position, at least one designated position at which a largest number of pieces of input information in the sheet have been input; and displaying, as an object image, a line image surrounding an important part that is a region corresponding to the important designated position.

* * * * *